United States Patent
Chopin et al.

[11] Patent Number: 6,136,891
[45] Date of Patent: Oct. 24, 2000

[54] COMPOSITE PARTICLES INCLUDING AN ORGANIC POLYMER AND AN OXIDE AND/OR HYDROXIDE

[75] Inventors: Thierry Chopin, Saint-Leu la Foret; Dominique Dupuis, Deuil-la-Barre; Dominique Labarre, Neuilly sur Seine; Gilles Mur, Villiers sur Marne, all of France

[73] Assignee: Rhodia Chimie, Courbevoie, France

[21] Appl. No.: 09/142,278

[22] PCT Filed: Mar. 6, 1997

[86] PCT No.: PCT/FR97/00396

§ 371 Date: Jan. 8, 1999

§ 102(e) Date: Jan. 8, 1999

[87] PCT Pub. No.: WO97/32920

PCT Pub. Date: Sep. 12, 1997

[30] Foreign Application Priority Data

Mar. 6, 1996 [FR] France .................................. 96 03067

[51] Int. Cl.⁷ .............................. C08K 9/02; C08K 9/04; C08J 7/32; A32B 5/16; B05D 1/36
[52] U.S. Cl. ......................... 523/204; 427/220; 427/224; 427/409; 428/407; 523/218
[58] Field of Search .................... 427/222, 220; 428/404, 407; 523/204, 218

[56] References Cited

U.S. PATENT DOCUMENTS

| | | | |
|---|---|---|---|
| 4,438,179 | 3/1984 | Sole | 427/222 |
| 4,584,244 | 4/1986 | Fenton | 427/222 |
| 4,873,102 | 10/1989 | Chang et al. | 427/222 |
| 5,318,797 | 6/1994 | Matijevic et al. | 523/204 |
| 5,506,280 | 4/1996 | Miller et al. | 523/204 |
| 5,658,969 | 8/1997 | Gerace | 523/204 |
| 5,756,210 | 5/1998 | Dupuis et al. | 427/222 |

FOREIGN PATENT DOCUMENTS

| | | | |
|---|---|---|---|
| 7157332 | 3/1996 | Canada . | |
| 462388 | 12/1991 | European Pat. Off. . | |
| 509494 | 10/1992 | European Pat. Off. | 523/204 |
| 516057 | 12/1992 | European Pat. Off. | 523/204 |
| 175071 | 7/1988 | Japan | 523/204 |
| 16860 | 1/1989 | Japan | 523/204 |
| 247154 | 10/1989 | Japan | 428/407 |
| 002021397 | 1/1990 | Japan . | |
| 002021396 | 11/1992 | Japan . | |

OTHER PUBLICATIONS

Chem. Abstracts vol. 113, No. 6, Jun. 1990.
Grant & Hackh's Chemical Dictionary, Mc–Graw Hill p. 598, Mar. 1991.

Primary Examiner—Peter A. Szekely
Attorney, Agent, or Firm—Jean-Louis Seugnet

[57] ABSTRACT

Composite particles having a core consisting of an organic polymer and a coating including at least one aluminum, silicon, zirconium and/or transition metal oxide and/or hydroxide, and optionally containing calcium carbonate, as well as methods for preparing same, are disclosed. The use of said composite particles for preparing hollow particles with a shell of the same kind as the above-mentioned coating is also disclosed. Finally, the use of said hollow composite particles as fillers or additives in plastics and elastomers is disclosed.

12 Claims, No Drawings

COMPOSITE PARTICLES INCLUDING AN ORGANIC POLYMER AND AN OXIDE AND/OR HYDROXIDE

This application is an application under 35 U.S.C. Section 371 of International Application Number PCT/FR97/00396, filed on Mar. 6, 1997.

The present invention relates to composite particles including a core based on at least one organic polymer and a skin based on at least one oxide and/or at least one hydroxide of aluminium, silicon, zirconium, zinc, and/or a transition metal.

The invention also relates to processes for preparing such particles and their use as fillers or additives for plastics or elastomers.

The invention still further relates to the use of said composite particles for preparing hollow particles comprising a skin based on at least one oxide and/or hydroxide of aluminium, silicon, zirconium, zinc, and/or a transition metal; these hollow particles too can be used as fillers or additives for plastics and elastomers.

In order to endow thermoplastic materials with high rigidity, it is known to introduce solid mineral particles. However, it has been shown that such reinforced plastics do not have sufficient mechanical properties (for example impact resistance) particularly at low temperatures.

Further, the introduction of mineral fillers in the form of particles of silica or carbon black into elastomers, in particular into elastomers for tyres, is known in order to improve the tear strength and abrasion resistance of those elastomers. However, such reinforced tyres lack flexibility at low temperatures.

The present invention thus provides composite particles constituted by a core comprising at least one organic polymer, at least partially coated with one or more layers comprising at least one oxide and/or at least one hydroxide of aluminium, silicon, zirconium, zinc, and/or a transition metal.

The present invention also provides a process for preparing composite particles comprising the following steps: bringing at least one organic polymer into contact with at least one hydrolysis catalyst, in suspension, then adding at least one aluminium, silicon, zirconium, zinc, and/or transition metal alkoxide, then separating and drying the composite particles obtained.

The invention also provides a process for preparing the composite particles defined above comprising the following steps: bringing at least one organic polymer into contact, in suspension, with at least one precipitating agent and at least one soluble aluminium, silicon, zirconium, zinc, and/or transition metal salt simultaneously, then separating and drying the composite particles thus obtained.

The present invention still further concerns the use of the composite particles to obtain hollow particles.

Finally, the invention concerns the use of composite particles, also of hollow particles, as fillers or additives in plastics and elastomers.

Further characteristics, details and advantages of the invention will become clear from the following description and examples.

Firstly, the invention concerns composite particles composed of a core based on at least one organic polymer, at least partially coated with an oxide and/or hydroxide of aluminium, silicon, zirconium, zinc, or a transition metal, the elements defined above being present alone or as a mixture, in one and/or other of the two forms.

More precisely, the oxide and/or hydroxide based coating (or equally, skin, layer) can only partially or completely coat each organic polymer core. It is also possible for the coating to be partially incrusted in the outer peripheral layer of the organic polymer core.

In an important variation of the present invention, an intermediate layer essentially based on an alkaline-earth metal hydroxide exists between the organic polymer-based core and the coating defined above.

The organic polymers forming part of the composition of the composite particles are latex type particles, i.e., particles of (co)polymers from conventional processes for emulsion (co)polymerisation of copolymerisable organic monomers.

Non limiting examples of (co)polymers forming part of the composition of the composite particles are those resulting from the polymerisation of the following monomers:

a) alkyl, hydroalkyl and chloroalkyl (meth)acrylates, alkyl or hydroxyalkyl chloroacrylates in which the alkyl radical preferably contains 1 to 18 carbon atoms, such as:
   methyl (meth)acrylate;
   ethyl or hydroxyethyl (meth)acrylate;
   propyl or hydroxypropyl (meth)acrylate;
   n-butyl, isobutyl or hydroxybutyl (meth)acrylate;
   amyl, lauryl or isoamyl (meth)acrylate;
   (2-ethyl-hexyl), ethyl, octyl, methyl, butyl, (3,3-dimethylbutyl), isobutyl, or isopropyl (meth)acrylate;
   chloroethyl (meth)acrylate;
   butyl, methyl, ethyl, isopropyl, or cyclohexyl chloroacrylate;

b) vinyl or allyl esters of saturated, linear or branched $C_1$–$C_{12}$ carboxylic acids such as:
   vinyl acetate;
   vinyl propionate;
   vinyl butyrate;
   allyl acetate;
   vinyl versatate® (registered trade mark for α-branched $C_9$–$C_{11}$ acid esters);
   vinyl laurate;
   vinyl benzoate;
   vinyl trimethylacetate;
   vinyl pivalate;
   vinyl trichloroacetate;

c) esters and hemi-esters of α,β-ethylenically unsaturated polycarboxylic acids containing 4 to 24 carbon atoms, such as:
   methyl, dimethyl, ethyl, butyl, or 2-ethylhexyl fumarate;
   methyl, dimethyl, ethyl, butyl, or 2-ethylhexyl maleate;

d) vinyl halides such as vinyl, vinylidene, etc . . . chlorides or fluorides;

e) fluorinated olefins such as tetrafluoroethylene, . . .

f) aromatic vinyl compounds preferably containing at most 24 carbon atoms, in particular selected from:
   styrene;
   α-methylstyrene, 4-methylstyrene, 2-methylstyrene, 3-methylstyrene;
   4-methoxystyrene;
   2-hydroxymethylstyrene;
   4-ethylstyrene;
   4-ethoxystyrene;
   3,4-dimethylstyrene;
   2-chlorostyrene, 3-chlorostyrene;
   4-chloro-3-methylstyrene;
   4-tert-butylstyrene;
   4-dichlorostyrene, 2,6-dichlorostyrene, 2,5-difluorostyrene;

1-vinylnaphthalene;
vinyltoluene;
g) conjugated aliphatic dienes preferably containing 3 to 12 carbon atoms such as:
1,3-butadiene;
isoprene;
2-chloro-1,3-butadiene;
h) α,β-ethylenically unsaturated nitriles preferably containing 3 to 6 carbon atoms such as acrylonitrile and methacrylonitrile.

It is possible to copolymerise certain of these principal monomers with up to 10% by weight of other monomers, termed co-monomers, which are ionic in nature, such as:
α,β-ethylenically unsaturated carboxylic acid monomers as mentioned above, including mono- and polycarboxylic acids such as:
acrylic acid;
methacrylic acid;
maleic acid;
itaconic acid;
fumaric acid;
crotonic acid, . . .
ethylenic monomers containing secondary, tertiary or quaternised amine groups such as: vinyl-pyridines, diethyl-aminoethylmethacrylate, . . . ;
sulphonated ethylenic monomers such as: vinylsulphonate, styrenesulphonate, . . . ;
zwitterionic ethylenic monomers such as: sulphopropyl-(dimethylaminopropyl) acrylate . . . ;
amides of unsaturated carboxylic acids such as: acrylamide, methacrylamide, . . . ;
esters of polyhydroxypropylated or polyhydroxyethylated (meth)acrylates and alcohols.

It is also possible to use anionic polymers such as vinyl polyacetate, or amphoteric polymers.

More particularly, copolymers of styrene with acrylates or butadiene can be mentioned. They can advantageously be selected from butadiene-styrene copolymers containing carboxylated, sulphated or sulphonated functions, acrylic copolymers and butadiene-styrene-acrylamide copolymers.

Polysiloxane elastomers can also be used as the organic polymer of the present invention.

More particularly, these organic polymers have a glass transition temperature in the range −200° C. to 200° C. In one particularly advantageous and preferred embodiment of the invention, the glass transition temperature is in the range −200° C. to 0° C.

As indicated above, the composite particles of the invention have a partial or complete layer coating the organic polymer described above; the layer is constituted by at least one oxide and/or at least one hydroxide of aluminium, silicon, zirconium, zinc, and/or a transition metal. The term "transition metal" means metals from the fourth period, copper.

Silicon, aluminium, titanium and zirconium are particularly suitable.

It should be noted that the layer coating at least part of the organic polymer may comprise an oxide and/or hydroxide of one only or a plurality of elements in the same layer. The scope of the invention also encompasses a mixture of composite particles in which the layer is of a different nature, with one or more of the elements defined above.

In a first variation of the present invention, the composite particles of the invention comprise a single layer of oxide and/or hydroxide.

In a second variation of the present invention, the composite particles comprise at least two layers, based on at least one oxide and/or at least one hydroxide of the elements defined above. In such a case, the two superimposed layers coating at least part of the organic polymer and at least partially coating each other can be based on one or more elements such as those defined above.

In a third variation of the invention, in addition to one or more oxide and/or hydroxide based layers, the composite particles have at least one calcium carbonate layer. This layer can be directly in contact with the organic polymer, i.e., between the organic polymer and the hydroxide and/or oxide based layers. It can also be located on the outer hydroxide and/or oxide layer, or between the hydroxide and/or oxide layers, if there are a plurality, or only between certain thereof. It should be noted that said composite particles can comprise a plurality of calcium carbonate-based layers.

A fourth variation of the present invention is constituted by composite particles having a layer essentially comprising one or more alkaline-earth metals essentially in the form of the hydroxide, between the core comprising at least one organic polymer and the layer comprising the oxide and/or hydroxide layer or layers defined above, and the optional calcium carbonate layer or layers, It should be noted that, more particularly, the particles of the invention are spherical.

The composite particles of the invention have an average diameter of at most 5 µm. Advantageously, it is normally at least 0.04 µm. The average diameter is preferably in the range 0.1 to 0.3 µm.

The average diameter of these particles and of all the other particles defined in the text, is determined by TEM.

These composite particles normally have a dispersion index of at most 0.50, preferably less than 0.30.

In this case and for all other dispersion indices defined in the text, the dispersion index is determined by the formula:

$$I = \frac{\emptyset_{84} - \emptyset_{16}}{2\emptyset_{50}}$$

where:
$\emptyset_{84}$ is the particle diameter for which 84% of the particles have a diameter of less than $\emptyset_{84}$;
$\emptyset_{16}$ is the particle diameter for which 16% of the particles have a diameter of less than $\emptyset_{16}$;
$\emptyset_{50}$ is the average particle diameter.

The dispersion index is measured by transmission electron microscopy (TEM).

It should be noted that the scope of the present invention also encompasses preparing bimodal composite particles, for example.

The diameter of the organic polymer core is normally in the range 0.04 to 5 µm.

The total thickness of the coating, i.e., comprising one or more layers based on at least one oxide and/or at least one hydroxide of the elements defined above, optionally at least one layer of calcium carbonate, and optionally a layer of an alkaline-earth metal hydroxide, is generally at most 500 nm. It is normally at least 1 nm and more particularly at least 5 nm. It is preferably in the range 5 to 200 nm.

The above dimensions are given by way of indication since it may become difficult to precisely determine the size of the organic polymer core and the thickness of the coating layer or layers (skin) if, as was indicated above, there is an incrustation of the latter into the peripheral outer layer of the organic polymer core. The organic polymer is soft and deformable, for example when it is at a temperature which is above its glass transition temperature. As a result, the coating may become incrusted. The measurements of the size of the organic polymer core and the thickness of the layer or layers defined above will thus be modified because of the existence of an intermediate layer resulting from the interaction between the organic polymer and the coating.

The specific surface area of the composite particles of the invention is preferably in the range 1 to 200 m$^2$/g, preferably in the range 1 to 100 m$^2$/g.

The term "specific surface area" means the BET specific surface area determined by nitrogen adsorption in accordance with United States standard ASTM D 3663-78 established on the basis of the BRUNAUER-EMMETT-TELLER method described in the journal "The Journal of the American Society", 60, 309, (1938).

This specific surface area can disclose the degree of smoothness of the layer coating the organic polymer.

Processes for preparing the composite particles of the invention will now be described.

It should be noted that these processes can be carried out on an industrial scale because of the high concentrations of salts and alkoxides which can be used. The layer or layers can be obtained using an amount of 250 kg of solids per kilogram.

Firstly, processes for preparing suspensions of composite particles comprising an organic polymer core at least partially coated with a layer of at least one hydroxide and/or at least one oxide of aluminium, silicon, zirconium, zinc, or a transition metal.

Thus in a first variation (alkoxide route), the following steps are carried out:

at least one organic polymer is brought into contact, in suspension, with at least one hydrolysis catalyst, then at least one alkoxide of aluminium, silicon, zirconium, zinc, and/or a transition metal is added;

the composite particles obtained are separated and dried.

The organic polymer or polymers is/are used in the form of a latex.

The liquid phase of this starting organic polymer latex is generally an aqueous, alcoholic or hydroalcoholic phase.

As an example, when the latexes are obtained by dispersion polymerisation of organic monomers, the liquid phase can be hydroalcoholic or alcoholic.

Alcoholic or hydroalcoholic suspensions of polymer(s) are preferably used.

The nature of the latex particles is that of the polymers of the composite particles defined above.

As indicated above, it is possible to mix two types of latex with different particle sizes, so as to obtain composite particles with a bimodal population distribution.

Particularly suitable alcohols are those which are soluble in water. Thus, more particularly, saturated, linear or branched monoalcohols containing 1 to 6 carbon atoms are selected. Diols such as ethylene glycol can also be used. Methanol and ethanol are particularly suitable and are preferred.

The catalyst added to the solution can be inorganic or organic, acidic or basic.

Thus a basic compound can be a hydroxide of an alkali metal such as sodium or potassium, or ammonia.

Hydrochloric acid, sulphuric acid and acetic acid are particular examples of acid catalysts.

The quantity of catalyst present in the medium is in general in the range 0.05 to 2 mol/kg.

Regarding the alkoxides, they are more particularly compounds with general formula $M^{n+}(OR)_n$ where M represents silicon, aluminium, zirconium, zinc, or a transition metal, n represents the valency of the element in question and R represents a hydrocarbon radical, which may or may not be linear, more particularly a saturated hydrocarbon, and containing 1 to 5 carbon atoms.

It should be noted that this variation is particularly suitable for preparing layers based on silicon and titanium.

The quantity of alkoxide brought into contact with the latex is calculated such that the latex particles are coated to a thickness of at most 500 nm.

The alkoxide is introduced into the suspension comprising the latex so as to avoid supersaturating the medium with alkoxides. In other words, the conditions are such that the formation of "non-grain" particles of silicon, titanium, aluminium or transition metal is avoided.

This is achieved by regulating the rate of introducing the alkoxide, the temperature, also the catalyst concentration.

The reaction temperature is normally in the range 20° C. to 80° C. It is preferably in the range 20° C. to 80° C.

The skilled person is capable of determining the rate of alkoxide introduction by carrying out routine tests.

The operation is generally carried out with stirring.

Further, the composite particle preparation process is carried out at atmospheric pressure, although the use of higher or lower pressures is not excluded.

At the end of this first step, a suspension of composite particles is obtained. More particularly, these suspensions are colloidal dispersions, i.e., fine particles of colloidal dimensions of organic polymer coated with at least one layer of hydroxide and/or oxide, in suspension in a liquid phase, which as described above can be alcoholic or hydroalcoholic.

It should be noted that the oxide and/or hydroxide of aluminium, silicon, zirconium, zinc, and/or a transition metal can be found either completely in the colloids or simultaneously in the form of ions and in the colloids, although the proportion represented by the ionic form cannot exceed about 10% of the total oxide and/or hydroxide of aluminium, silicon, zirconium, zinc, or a transition metal in the colloidal dispersion.

In the invention, colloidal dispersions are preferably used in which the oxide and/or hydroxide of aluminium, silicon, zirconium, zinc, or a transition metal is completely in the colloids.

The resulting composite particles are then dried.

This can be carried out directly on the suspension obtained.

It is also possible to dry a suspension which has been separated from the reaction medium. The particles can be separated from the medium using conventional methods, such as centrifugation.

It should be noted that this second possibility is particularly advantageous when the composite particles are to undergo a surface treatment prior to drying.

This treatment generally consists of taking the composite particles up into suspension again then introducing at least one organic compound, such as stearic acid, stearates or polysiloxane oils, into the suspension.

This type of pre-treatment can prevent agglomeration of the composite particles during the drying step. It can also endow the particles with particular properties, such as a hydrophobic nature. This treatment can also compatibilise the composite particles with the medium into which they will subsequently be introduced.

In a particular embodiment of the invention, the composite particles are separated from the reaction medium and dried by atomisation, i.e., by spraying the mixture into a hot atmosphere (spray-drying). Atomisation can be carried out using any known sprayer, for example a sprinkler or other type spray nozzle. It is also possible to use turbine type atomisers. Reference should be made to the standard text by Masters entitled "SPRAY-DRYING" (second edition, 1976, George Goodwin, London) regarding the variety of spraying techniques which can be used in the present process.

It should be noted that it is also possible to carry out spray drying using a "flash" reactor, for example of the type described in French patent FR-A-2 257 326, FR-A-2 419 754 and FR-A-2 431 321. In this case, the treatment gases (hot gases) are caused to move in a helical motion and flow in a vortex tube. The mixture to be dried is injected along a trajectory which is identical with the axis of symmetry of the helical trajectories of the gases, allowing the motion of the gas to be perfectly transferred to the mixture to be treated. The gases thus carry out a double function: spraying, i.e., transformation into fine particles, of the initial mixture, and drying of the particles obtained. Further, the extremely short residence time (generally less than about 1/10 of a second) of the particles in the reactor has the advantage, inter alia, of limiting any risks of overheating as a result of too long a contact with the hot gases.

Depending on the respective flow rates of the gas and the mixture to be dried, the inlet temperature of the gases is in the range 400° C. to 900° C., in particular in the range 600° C. to 800° C. The temperature of the dried solid is in the range 150° C. to 300° C.

Regarding the flash reactor mentioned above, reference should be made in this respect to FIG. 1 of French patent application FR-A-2 431 321.

It is constituted by a combustion chamber and a contact chamber composed of a twin cone or a truncated cone the upper part of which diverges. The combustion chamber opens into the contact chamber via a reduced passage.

The upper portion of the combustion chamber is provided with an opening for introducing the fuel phase. The combustion chamber also comprises an inner coaxial cylinder defining inside it a central zone and an annular peripheral zone with perforations mostly located towards the upper portion of the apparatus. The chamber includes a minimum of six perforations distributed in at least one circle, preferably in a plurality of axially spaced circles. The total surface area of perforations localised in the upper portion of the chamber can be very small, of the order of 1/10 to 1/100 of the total surface area of the perforations in the inner coaxial cylinder.

The perforations are normally circular and of very low thickness. Preferably, the ratio of the diameter thereof to the thickness of the wall is at least 5, the minimum thickness of the wall only being limited by mechanical requirements.

Finally, a bent tube opens into the reduced passage, the extremity of the tube opening into the axis of the central zone.

The gas phase caused to move in a helical motion (henceforth termed the helical phase) is composed of a gas, generally air, introduced into an orifice formed in the annular zone, preferably located in the lower portion of that zone.

In order to obtain a helical phase at the reduced passage, the gas phase is preferably introduced into the orifice mentioned above at low pressure, i.e., at a pressure of less than 1 bar and more particularly at a pressure in the range 0.2 to 0.5 bar above the pressure existing in the contact chamber. The velocity of this helical phase is generally in the range 10 to 100 m/s, preferably in the range 30 to 60 m/s.

Further, a fuel phase which can be methane is injected axially via the opening defined above into the central zone at a velocity of about 100 to 150 m/s.

The fuel phase is ignited by any known means, in the region where the fuel and helical phase are in contact.

As a result, the path imposed on the gases in the reduced passage follows assembly of trajectories identical with families of generatrices of a hyperboloid. These generatrices are based on a group of circles, small rings localised near to and below the reduced passage, before diverging in all directions.

The mixture to be treated is then introduced in the form of a liquid via the tube defined above. The liquid is then fractionated into a multitude of droplets, each being transported by a volume of gas and being subjected to a movement creating a centrifuge effect. The velocity of the liquid is normally in the range 0.03 to 10 m/s.

The ratio between the quantity of movement of the helical phase and that of the liquid mixture must be high. In particular, it is at least 100 and preferably in the range 1000 to 10000. The amount of movement in the reduced passage is calculated as a function of the inlet velocities of the gas and of the mixture to be treated, also the cross section of said passage. An increase in the velocities will cause the droplet size to increase.

Under these conditions, the direction and intensity of the gas motion is imposed on the droplets in the mixture to be treated, separated from each other in the zone where the two streams converge. The velocity of the liquid mixture is also reduced to the minimum necessary to obtain a continuous flow.

In a preferred implementation, spraying is carried out such that the inlet temperature into the atomiser is of the order of 200° C. and that at the outlet is 120° C.

The scope of the present invention also encompasses carrying out the surface treatment defined above on the dried composite particles. Information already given in this respect will not be repeated here. This type of treatment can compatibilise or improve the compatibility of the composite particles thus treated, in the medium into which they are introduced as filler or additives.

In a second variation for preparing suspensions of composite particles (salt route), the following steps are carried out:

at least one organic polymer is brought into contact, in suspension, with at least one precipitating agent and at least one soluble aluminium, silicon, zirconium, zinc, and/or transition metal salt simultaneously;

the composite particles obtained are separated and dried.

Information already given with respect to the first variation of the process regarding the latex remains valid and will not be repeated here.

Thus the organic polymer or polymers are used in the form of at least one latex in which the liquid phase is alcoholic, hydroalcoholic or, as is preferable in this variation, aqueous.

Suitable aluminium, silicon, zirconium, zinc, or transition metal salts are selected from salts which are soluble in water or in hydroalcoholic solutions and which produce a precipitate in the form of the oxide and/or hydroxide when brought into the presence of a suitable precipitating agent.

Non limiting examples are alkali metal silicates, alkali metal aluminates and oxychlorides, chlorides, nitrates and sulphates of aluminium, zirconium, zinc, or a transition metal.

The quantity of salts brought into contact with the latex is calculated such that the thickness of the latex particle coating is at most 500 nm.

The salts defined above are preferably used in the form of an aqueous solution.

The precipitating agent can be selected from acid or basic compounds. Non limiting examples of suitable precipitating agents are phosphoric acid, sulphuric acid, acetic acid, alkali metal hydroxides, ammonia, and carbon dioxide (bubbled through).

The quantity of precipitating agent is such that the pH of the medium is kept in a range where precipitation of the elements is optimal. This pH range is generally between 8 and 11. Further, the operation is preferably carried out such that the pH remains constant.

The salt is introduced into the suspension containing latex such that supersaturation of the medium by the salts is avoided. In other words, the formation of "non-grain" particles of aluminium, silicon, zirconium, zinc, or transition metal is avoided.

This is achieved by controlling the rate of introducing the salt, which the skilled person can determine by carrying out simple routine tests.

The precipitation temperature is preferably also controlled. More particularly, it is in the range 20° C. to 120° C., preferably in the range 20° C. to 90° C.

More particularly, the precipitation operation takes place with stirring.

Further, the process for preparing suspensions of composite particles is carried out at atmospheric pressure, although higher and lower pressures are not excluded.

As indicated above, the present invention also relates to composite particles which may comprise, between the polymeric core and the coating, a layer comprising at least one alkaline-earth metal compound, essentially in the form of the hydroxide.

Particularly suitable alkaline-earth metals are calcium and magnesium.

This type of particle results from a variation in the process for preparing said particles used soluble salts.

These particles can be obtained by carrying out the steps just described prior to bringing the organic polymer or polymers into contact with at least one soluble aluminium, silicon, zirconium, zinc, or transition metal salt as defined above.

Thus at least one salt which is soluble under the pH conditions of the suspension is introduced into the suspension comprising at least one organic polymer.

The suspension is preferably either aqueous or hydroalcoholic.

Particularly suitable salts are the halides, in particular chlorides, or sulphates.

The pH of the liquid phase of the suspension comprising the soluble salt or salts is then increased by adding a base such as sodium hydroxide, potassium hydroxide or ammonia. In this manner, a precipitate is created comprising essentially the hydroxide of the alkaline-earth metals used, on the surface of the organic polymer.

It should be noted that this variation is particularly suitable for encouraging the production of a homogeneous coating around the organic polymer.

The quantity of salts used is a function of the thickness of the desired layer. By way of indication, the quantity of alkaline-earth metal salt is generally in the range 0.5 to 5 g per 80 g of dry latex.

Once the operation is finished, the second method for preparing the composite particles of the invention is advantageously directly carried out. Thus at least one soluble salt of the elements defined above in the presence of a precipitating agent are simultaneously introduced into the suspension comprising the organic polymer or polymers coated at least in part with a layer essentially comprising an alkaline-earth in the form of a hydroxide. Information already given in this respect remains valid and will not be repeated here.

It may be possible to separate the particles obtained before treating them using the salt route synthesis method, but this would not be of any particular advantage.

In order to preserve the stability of the latex and avoid breaking during the composite particle preparation process, for all variations of the synthesis described, a stabiliser can be added to the latex before first contact with the solution of alkoxides, soluble salts of the elements defined above, or the soluble alkaline-earth metal salts.

As an indication, the stabiliser may be a non ionic surfactant of the polyethoxylated alkylphenol, polyethylene glycol or polyvinylpyrrolidone type.

In general, 1 to 50 g of stabiliser per kg of organic polymer latex is added, preferably less than 20 g/kg.

When a surfactant type stabiliser is added to the reaction mixture to stabilise the latex, it may be necessary to simultaneously add an antifoaming agent to avoid the presence of too many bubbles.

The particles in suspension may comprise at least two layers at least partially coating the organic polymer.

In this case, the composite particles obtained using one or the other of the two variations described above can again be brought into contact with a solution of an alkoxide or a salt, respectively in accordance with the first and second variation, to produce a layer deposited on the first layer. As a result, this consists of carrying out the "alkoxide route" process several times in succession or the "salt route" several times in succession, or a successive combination of these two process types, each time obtaining a supplemental layer; these operations can be repeated as many times as there are layers are to be deposited.

Information already given regarding the two variations for preparing the composite particle suspensions remains valid and will not be repeated here.

As mentioned above, the particles in suspensions of the invention may comprise a calcium carbonate layer in addition to one or more hydroxide and/or oxide layers. In this case, one of the steps of the process will be as follows:

bringing at least one organic polymer or composite particles obtained using one or the other of the two variations defined above, into contact with calcium hydroxide;

adding carbon dioxide.

In this manner, a precipitate of calcium carbonate is obtained—which partially or completely coats each organic polymer particle or each composite particle.

The calcium hydroxide is preferably present in the form of a suspension of calcium hydroxide particles of varying size. This suspension of calcium hydroxide can be obtained by different means: from calcium oxide or from a calcium salt with added base (NaOH, KOH, $NH_3$). Suspensions of calcium hydroxide in the form of milk of lime are preferred.

The concentration of particles in the calcium hydroxide suspension can advantageously be in the range 0.1 to 3 mole/kg.

Its viscosity can be between 0.05 and 0.5 Pa.s (viscosity measured at 50 $s^{-1}$).

Gaseous carbon dioxide is introduced into the mixture of latex or composite particles obtained by any method.

It should be noted that if the calcium carbonate layer is deposited directly on the latex, in order to preserve the stability of the latex during the process and to avoid breaking, it is advantageous to add a latex stabiliser before bringing it into the presence of the calcium hydroxide. The stabilisers, the amounts used, and the optional presence of an antifoaming agent have been described above as options, and are also applicable to this latest variation.

It should be noted that a calcium carbonate growth inhibitor can be introduced into the mixture of latex or composite particles and calcium hydroxide, to control the thickness of the precipitated calcium carbonate layer formed. Examples are citric acid, citrates, phosphate based agents and the latex stabilisers defined above.

The inhibitor is introduced into the reaction mixture before introducing the carbon dioxide.

The temperature and pressure conditions are identical to those mentioned for the preceding variations.

The carbon dioxide is preferably introduced in the form of a gaseous mixture of carbon dioxide and air or nitrogen in a ratio in the range 5% to 50% by volume, preferably of the order of 30%. The carbon dioxide is generally added by bubbling the gaseous mixture into the mixture of latex and calcium hydroxide.

More particularly, the carbon dioxide introduction rate is in the range 40 ml/h/kg to 200 l/h/kg of the mixture of latex or composite particles and calcium hydroxide. The rate can change as a function of the quantity of latex or composite particles to be treated and the thickness of the calcium carbonate layer which is to be precipitated.

Whatever the variations used to obtain composite particles comprising one or more layers of oxide and/or hydroxide, and optionally calcium carbonate, one or more ageing steps can be carried out.

This normally consists of leaving the mixture obtained, generally with stirring. The temperature is normally in the range 20° C. to 120° C. The duration of this operation, by way of example, can vary from several minutes to two hours.

The suspended composite particles thus obtained are then dried. Reference should be made to the description of the various drying methods described above.

The invention also encompasses the use of the composite particles described above to obtain hollow particles comprising at least one oxide and/or a hydroxide of aluminium, silicon, zirconium, zinc, or a transition metal and optionally one or more inner, outer or intermediate layers based on calcium carbonate. The hollow particles can optionally comprise at least one alkaline-earth metal hydroxide, as an at least partial inner layer.

It should be noted that the hollow particles obtained from the composite particles of the invention are more particularly spherical.

The average diameter is at most 5 $\mu$m. Advantageously, it is normally at least 0.04 $\mu$m. In a particular embodiment of the invention, the average diameter is in the range 0.1 to 0.3 $\mu$m.

These hollow particles normally have a dispersion index as defined above of at most 0.50, preferably less than 0.30.

As for the composite particles, the hollow particles can have a bimodal distribution if they are obtained using a mixture of two latexes.

The skin thickness is generally at most 500 nm. It is normally at least 1 nm, more particularly at least 5 nm. It is preferably in the range 5 to 200 nm.

The specific surface area of these hollow particles is in the range 1 to 200 m$^2$/g, preferably in the range 1 to 100 m$^2$/g.

In a first variation, the hollow particles are obtained by calcining the composite particles described above.

Calcining is carried out at a sufficient temperature for the core of the organic polymer of the composite particles to be decomposed to a gas.

This temperature is normally in the range 400° C. to 900° C., more particularly 650° C.

This calcining completely decomposes the organic polymer core into a gas which is transmitted through the skin to create a hollow particle.

In a preferred variation of the first implementation, the composite particles are subjected to a temperature rise of the order of 3° C./min to a temperature of 650° C. The particles are then kept at this temperature for 5 hours.

In a second implementation, hollow particles are obtained by bringing the composite particles defined above into contact with a solvent for the organic polymer. The organic polymer core is dissolved in this operation. The particles are then separated from the liquid medium, for example by centrifugation, then the resulting hollow particles are dried.

Drying is carried out at a temperature in the range 25° C. to 200° C.

In carrying out this second implementation, a suspension of hollow particles is obtained as an intermediate. This corresponds to the suspension obtained after dissolving the organic polymer.

It should be noted that suspensions of hollow particles can then be prepared by taking the dried or calcined particles up into suspension again in a solvent suitable for the intended use.

The hollow particles can optionally undergo a surface treatment, for example by impregnation, using an organic compound which can be selected from fatty acids, fatty acid esters, or polysiloxane oils.

The average diameter, dispersion index, specific surface area and skin thickness of the hollow particles has been defined above.

Finally, the invention concerns the use of composite particles as fillers in plastics or elastomers.

These products are particularly used for all plastics intended to be reinforced against impact, such as polyolefins, polyvinyl chlorides, polyamides, styrene polymers . . .

The introduction of the composite particles of the invention has been shown to improve the mechanical properties of the plastics.

These particles are also used in elastomers such as natural rubber, polyisoprene, polybutadiene and butadiene-styrene copolymers.

The introduction of the composite particles of the invention has been shown to endow elastomers with low temperature flexibility.

The invention concerns the use of hollow particles as a reinforcing filler for elastomers. These particles are preferably used in the same elastomers as those defined above.

It has been shown that elastomers, in particular tyres, acquire increased low temperature flexibility following introduction of the hollow particles of the invention into the matrix.

Some examples will now be given.

EXAMPLE 1

The following reactants were used:

| | |
|---|---|
| TD 180 latex* | 1.49 g sec |
| | 1.50 (i.e., 6.47 g, 23% in ethanol) |
| Ethyl silicate | 6.7 g |
| Ethanol (95%) | 385 g |
| Water | 8.38 g |
| Ammonia (20%) | 25.5 g |
| Polyvinylpyrrolidone (MW = 40.10$^3$) | 1.6 g |

*The latex was constituted by a suspension in ethanol of dispersion synthesised polystyrene, 2.4 $\mu$m, stabilised by polyvinylpyrrolidone (MW = 40000) and OT 100 aerosol (sodium dioctylsulphosuccinate, Cyanamid).

The latex, ethanol and ammonia were mixed in a reactor and the ethyl silicate was introduced over 3 hours.

This operation was carried out at 25° C.

The particles were separated by centrifugation and washed in ethanol.

The washed particles were oven dried at 50° C.

Monodispersed composite particles constituted by a polystyrene core of 2.4 μm and a silica skin of 0.08 μm were obtained.

The dispersion index was 0.3.

TEM measurements established that the size of the particles constituting the skin was 100 nm.

EXAMPLE 2

The procedure of the preceding example was followed with the exception that the operation was carried out at 50° C.

The composite particles obtained were monodispersed, not agglomerated, and constituted by a polystyrene core of 2.4 μm and a silica skin of 0.08 μm.

TEM measurements established that the size of the particles constituting the skin was 50 nm. The skin was compact.

EXAMPLE 3

This example concerns the preparation of composite particles with a polystyrene-butadiene core and a $Ca(OH)_2$ and silica skin.

The following reactants were used:

| | |
|---|---|
| Rhoximat ® SB012 styrene/butadiene latex | 80 g sec (i.e., 160 g, 50% in water) |
| $CaCl_2 2H_2O$ (Prolabo-Normapur) | 2.1 g (dissolved in 101.6 g of water) |
| Sodium silicate (Prolabo-Rectapur) (d = 1.33) | 238.8 g (diluted in 161.2 g of water) |
| Purified water | 1010.8 g |
| NaOH 1 mol/l (Fixanal) | qsp pH = 9 |
| $H_2SO_4$ 1 mol/l (Fixanal) | qsp regulation pH = 9 |

*The granulometry of the latex was 0.15 μm, and the glass transition temperature was −5° C.

The latex and 748 g of the purified water were added to a reactor (starter mixture).

The pH was adjusted to 5 by adding $H_2SO_4$.

The aqueous calcium chloride solution was added to the starter mixture at a rate of 4.9 ml/min.

The pH of the reaction mixture was kept to 5 during the calcium addition.

After adding the calcium chloride, an aqueous 1M sodium hydroxide solution was added to increase the pH to 9 (mass of sodium hydroxide solution introduced (1M)=3.65 g).

The reactor was then heated to 50° C.

At 50° C. and at pH of 9, the sodium silicate solution (diluted in 161.2 g of water) was added at a rate of 1.6 ml/min simultaneously with the sulphuric acid solution (1M), at constant pH.

The mass of sulphuric acid required was 310 g.

After introducing the silicate, an ageing period of 2 hours at 50° C. was carried out.

After cooling, the particles were separated by centrifugation, washing and re-dispersing in an aqueous medium (DM: 20%).

10% of stearic acid with respect to the solid was added to the resulting suspension at 80° C. The suspension was kept at 80° C. then spray dried (outlet temperature=110° C.).

A hydrophobic particle powder was recovered.

EXAMPLE 4

The spray dried particles of Example 3 were calcined at 600° C. for 4 hours (temperature increase 1° C./min).

The particles obtained were characterized by TEM.

The particles were hollow with a size of close to 0.15 μm.

What is claimed is:

1. A composite particle constituted by a core comprising at least one organic polymer, at least partially coated with one or more layers comprising at least one oxide or at least one hydroxide of aluminum, silicon, zirconium zinc, or a transition metal and, having a layer comprising an hydroxide of alkaline-earth metal between the core and the said layer comprising at least one oxide or at least one hydroxide of aluminum, silicon, zirconium zinc, or a transition metal.

2. A composite particle according to claim 1, comprising at least two layers of at least one oxide or hydroxide of aluminum, silicon, zirconium or a transition metal.

3. A composite particle according to claim 1, further comprising at least one layer of calcium carbonate.

4. A composite particle according to claim 1, wherein the organic polymer is a styrene-butadiene copolymer containing carboxylated, sulphated or sulphonated functions, an acrylic copolymer, a styrene-butadiene-acrylamide copolymer, or a polysiloxane elastomer.

5. A composite particle according to claim 1, wherein the organic polymer has a glass transition temperature in the range −200° C. to 0° C.

6. A composite particle according to claim 1, having an average diameter of at most 5 μm.

7. A composite particle according to claim 1, wherein the total thickness of said layer comprising at least one oxide or at least one hydroxide of aluminum, silicon, zirconium, or a transition metal is at most 500 nm.

8. A composite particle according to claim 7, wherein the total thickness of said layer, is in the range 5 to 200 nm.

9. The particles according to claim 1 which are hollow.

10. The particles as defined in claim 9, wherein the composite particles are calcined.

11. A plastic or an elastomer comprising, as a filler or additive, composite particles as defined in claim 1.

12. An elastomer comprising, as a reinforcing filler, hollow particles as defined in claim 9.

* * * * *